United States Patent [19]
Mort

[11] Patent Number: 4,641,480
[45] Date of Patent: Feb. 10, 1987

[54] COMBINATION CONNECTOR PLATE AND TAIL TRUSS

[75] Inventor: Edgar A. Mort, Poland, Ohio

[73] Assignee: Inter-Lock Steel Company, Inc., East Palestine, Ohio

[21] Appl. No.: 740,854

[22] Filed: Jun. 3, 1985

[51] Int. Cl.[4] ............................................. E04C 3/12
[52] U.S. Cl. ................................... 52/693; 411/466; 403/230
[58] Field of Search ............... 411/466, 467, 461, 462, 411/463; 52/DIG. 6, 293, 292, 299, 693, 93; 403/230, 231, 13

[56] References Cited

U.S. PATENT DOCUMENTS

| | | | |
|---|---|---|---|
| 493,882 | 3/1893 | White | 403/231 |
| 702,332 | 6/1902 | Samen | 52/691 |
| 2,827,676 | 3/1958 | Sanford | 411/466 |
| 2,844,852 | 7/1958 | West | 411/466 |
| 3,292,481 | 12/1966 | Couch | 52/713 |
| 3,345,792 | 10/1967 | Chandler | 52/648 |
| 3,531,904 | 10/1970 | Sanford | 52/730 |
| 3,651,612 | 3/1972 | Schmidt | 52/693 |
| 3,867,803 | 2/1975 | Platt | 52/693 |
| 4,001,999 | 1/1977 | Chandler | 52/693 |
| 4,031,686 | 6/1977 | Sanford | 52/693 |
| 4,209,265 | 6/1980 | Moehlenpah | 403/230 |
| 4,418,509 | 12/1983 | Moyer | 52/693 |

FOREIGN PATENT DOCUMENTS 776352 1/1968 Canada ............................ 411/466

OTHER PUBLICATIONS

Sweet's Catalog File—1979, Sec. 6.4 b/Hy pp. 1,2,7 and 6.4b/Al pp. 4,5,8.

*Primary Examiner*—John E. Murtagh
*Attorney, Agent, or Firm*—Harpman & Harpman

[57] ABSTRACT

A connector plate and tail truss are combined so that the formation of a floor truss of the tail truss type results wherein an extension of the top chord of the vertically spaced parallel chords extends outwardly beyond the end members of the truss so as to support the same on a bearing wall. The connector plate is of a general T-shape having a plurality of teeth struck therefrom with each of the plurality of teeth having a twisted shape with the outer portion of each of the teeth lying at approximately 50 degrees to the inner portion thereof adjacent the plate from which the teeth are struck. The twisted configuration of the teeth is such that any tendency of the truss to move vertically relative to the extended end portions thereof is resisted by the several teeth which tend to move inwardly of the timber of the truss so that the combined truss and connector plate resists sagging of the truss that would otherwise occur.

2 Claims, 5 Drawing Figures

COMBINATION CONNECTOR PLATE AND TAIL TRUSS

BACKGROUND OF THE INVENTION

1. Technical Field

This invention relates to nailer plates or fasteners for connecting intersecting wood members together in abutting relation in combination with a floor truss having an extending carrying section or tail portion.

2. Description of the Prior Art

A floor truss or joist is shown in U.S. Pat. No. 3,651,612 in which the end sections define the ends of the vertically spaced parallel upper and lower chords. U.S. Pat. Nos. 2,844,852, 3,225,643 and 3,292,481 show roof truss constructions wherein the upper chords are angularly disposed with respect to the lower chords and wherein T-shaped connector plates are illustrated at the apex of each of the trusses in areas wherein the compression forces of the upper chords are directed against vertical web members. Double ended T-shaped connector plates are seen in U.S. Pat. No. 3,503,173 and L-shaped connector plates are seen in U.S. Pat. No. 4,209,265. No prior art is known wherein extensions of the upper chords of a of a floor truss or the like extend beyond the end sections of the truss and are reinforced by connector plates and positioned on a bearing wall.

The present invention substantially modifies connector plates or nailer plates as heretofore known in the art and makes possible the production of floor trusses with upper chord extensions or tails capable of resisting the tendency of the extensions or tails to distort upwardly as loads are applied to the floor truss largely suspended therefrom.

SUMMARY OF THE INVENTION

The combination of a connector plate and a tail truss or the like joins the upper horizontal chord of the tail truss inwardly of the extending bearing end thereof with the upper portion of the vertical end section of the truss, the connector plate being T-shaped and provided with a plurality of outwardly struck nail portions, each of which is twisted on its longitudinal axis to enable it to resist a vertical shearing force and upward deflection.

DESCRIPTION OF THE PREFERRED EMBODIMENT

Figure 1:
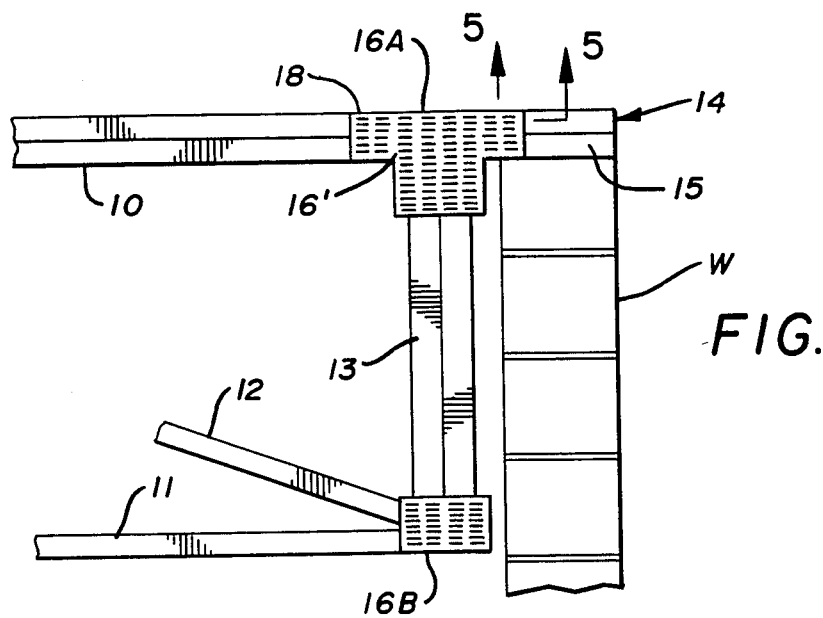
FIG. 1 is a side elevation of an end portion of a combined connector plate and tail truss having a bearing extension or tail positioned in truss supporting relation on a bearing wall.

By referring to the drawings and FIG. 1 in particular, an end portion of a floor truss having bearing extensions or tails will be seen to comprise an upper chord 10 and a parallel lower chord 11 spaced vertically with respect to one another and joined intermediate their ends by diagonally positioned webs, one of which is indicated by the numeral 12. A vertically positioned end section 13 joins and spaces the upper chord 10 and the lower chord 11. The vertical end section 13 engages the upper chord 10 inwardly of an end 14 thereof, the portion the upper chord 10 between the end 14 and the vertical end section 13 comprising a bearing or tail extension 15 of the upper chord 10 which enables the end of the floor truss to be positioned alongside a bearing wall W with the bearing or tail extension 15 of the upper chord 10 resting on the wall W so that the majority of the floor or tail truss is suspended from the extension 15. The upper and lower chords 10 and 11 and the diagonally positioned webs 12 and the end sections 13 of the truss are formed of wooden members such as two by fours. The wooden members of the upper and lower chords 10 and 11, the diagonally positioned webs 12 and the vertically positioned end sections 13 are joined to one another by connector plates, two of which are illustrated in FIG. 1 of the drawings. The upper connector plate is indicated by the numeral 16A and the lower connector plate is indicated by the numeral 16B.

This invention relates to the combination of the truss and the upper connector plate 16A which is of a general T-shape formed of a base plate 16' of sheet metal, preferably galvanized commercial steel or the like, having a plurality of integral teeth 17 struck outwardly therefrom in oppositely disposed pairs leaving an elongated slot 18 extending therebetween. Each of the elongated teeth 17 is approximately three-eights of an inch long and they and the slots 18 from which they are struck are preferably arranged in parallel rows extending vertically of the connector plates 16A and 16B respectively.

Preferably, the teeth 17 and the slots 18 from which they are struck from the base plate 16' are of a size enabling at least two parallel rows of the pairs of teeth 17 to be engaged in the narrow side of each of the two by four wooden members used in the floor or tail truss combination.

Figure 2:
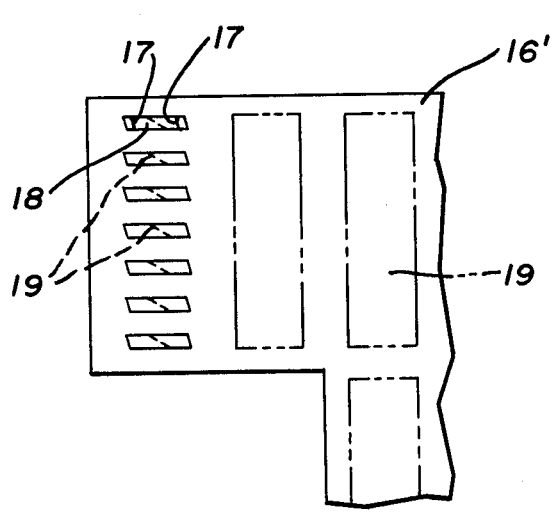
FIG. 2 is a symbolic illustration of a portion of the connector plate seen in FIG. 1 illustrating the spacing and arrangement of the nails struck outwardly thereof.

By referring to FIG. 2 of the drawings, it will be seen that a pair of teeth 17 are struck from the base plate 16' of the T-shaped connector plate by first striking the base plate 16' with a plurality of diagonal punches arranged to sever the metal of the base plate 16' on the broken lines 19 and subsequently striking the teeth 17 to bend them outwardly from the base plate 16' in oppositely disposed relation with their outermost ends pointed by reason of the previous diagonal cut on the lines 19. The multiple punch die used in striking the teeth 17 outwardly includes a portion shaping the teeth 17 by twisting a portion of each of the teeth 17 approximately 50°.

Figure 4:
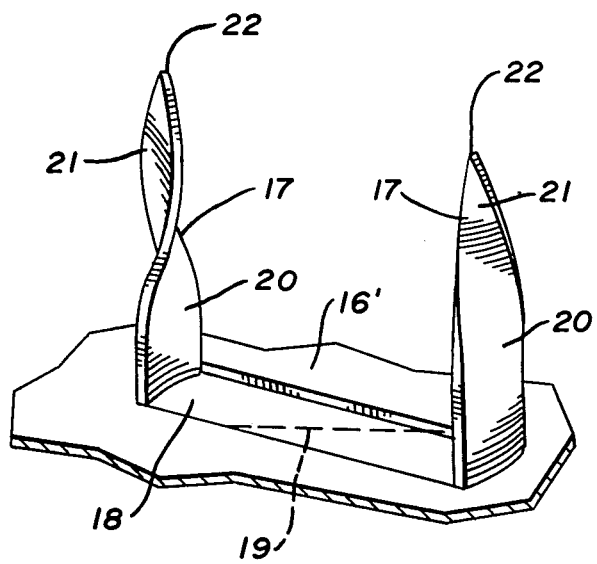
FIG. 4 is an enlarged perspective elevation of a portion of the connector plate of FIGS. 1, 2 and 3 and a pair of the nails struck outwardly therefrom.

By referring to FIG. 4 of the drawings, an enlarged section of the base plate 16' illustrates a spaced pair of teeth 17 struck from the base plate 16' to leave the slot 18 therebetween, the broken line 19 having been added in this figure to illustrate the approximate location of the original diagonal punch resulting in the pointed upper half portions of each of the teeth 17. A lower portion 20 of each of the teeth 17 will be seen to be substantially parallel with the end of the slot 18 remaining after its formation and that its upper half 21 which is twisted approximately 50 degrees with respect to the lower half 20 is tapered to a point 22 by reason of the initial diagonal punch on the lines 19 and the configuration of the dies carrying the multiplicity of punches which strike out the teeth 17 from the base plate 16'.

Figure 5:
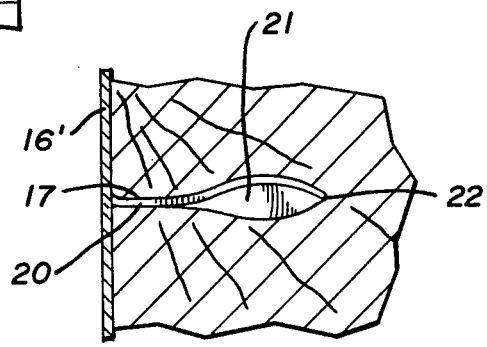
FIG. 5 is an enlarged vertical section through a portion of the combination of FIG. 1 illustrating one of the twisted nails struck outwardly therefrom embedded in a wood member of the tail truss.
Figure 3:
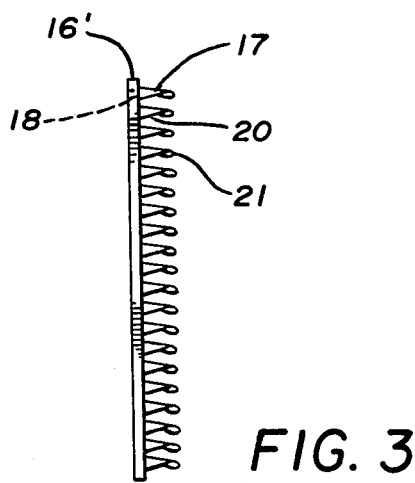
FIG. 3 is a symbolic illustration comprising an end view of the nailer plate seen in FIG. 1 and illustrating the plurality of nails struck outwardly therefrom.

In FIG. 5 of the drawings, which is an enlarged view on line 5—5 of FIG. 1, one of the struck out teeth 17 with its 90 degree twist and pointed end 22 is shown forcefully embedded in one of the wooden members making up the upper chord 10 of the tail truss partially illustrated in FIG. 1 of the drawings.

It will occur to those skilled in the art that the unique configuration of the connector plate 16 and more particularly the multiplicity of twisted pointed teeth 17 formed integrally therefrom at right angles thereto result in an unusual combination when the T-shaped connector plate 16A is positioned at the junctions of the upper chord 10 and the vertically positioned end section 13 of the floor or tail truss. The combination presents a number of the twisted, pointed teeth 17 engaged in the tail or extension 15 of the floor or tail truss partially above the bearing wall W where the connector plate not only joins the wooden members of the truss, but reinforces the junction of the vertically positioned end section 13 of the truss with the upper chord 10 of the truss and more importantly reinforces the tail or extension 15 of the upper chord 10 where it rests on the bearing wall W. As weight is applied to the tail truss, the tail or extension 15 thereof on the bearing wall W retains its straight line end to end relationship with the remainder of the upper chord 10 and overcomes the tendency of the tail or extension 15 to curve upwardly as the remainder of the truss tends to move downwardly under the weight load and the resulting shear force imparted to the tail or extension 15 adjacent the vertically positioned end section 13 of the tail truss.

The combination connector plate and tail truss thus remains in its desired position with the tail or extension portion 15 lying flat on the upper surface of the wall W and the remainder of the tail truss remaining on a straight line which is highly desirable in a floor construction.

It will be understood by those skilled in the art that the relative sizes and positioning of the wooden members of the tail truss disclosed herein are immaterial to the successful formation of the combination connector plate and tail truss disclosed herein and it will be observed that the unique properties of the out struck nails 17 and their twisted pointed configurations resist any tendency of the shearing force to which the tail truss is subjected to pull the nails from the wooden members of the truss.

It will thus be seen that a substantial improvement in floor trusses and tail trusses and the like having extending bearing sections has been disclosed and having thus described my invention, what I claim is:

1. An improvement in a tail truss having upper and lower chords, diagonal webs and vertical end sections connecting said chords and end extensions on said upper chord extending beyond said vertical end sections; the improvement comprising a structural joint consisting of a combination of said vertical end sections, the end extensions on said upper chord, the portions of said upper chord adjacent said vertical end sections T-shaped connector plates joining each of said vertical end sections to said portions of said upper chord adjacent each of said vertical end sections and the end extensions of said upper chord, said upper and lower chords, diagonal webs and vertical end sections being formed of wooden members and each of said T-shaped connector plates consisting of a metal plate having a vertical portion and a horizontal portion and having a multiplicity of struck out nails thereon formed therefrom at right angles thereto and embedded in said vertical end sections and said upper chord and end extensions thereof with said horizontal portions of said T-shaped connector plates extending along said upper chord and along said end extensions thereof so as to hold said end extensions in axial alignment with said upper chord from which they extend, said T-shaped connector plates being applied to both sides of said tail truss and having said vertical portions affixed to said vertical end sections with said horizontal portions being affixed to said upper chord on both sides of said vertical end section.

2. The improvement in a tail truss set forth in claim 1 and wherein said horizontal portion of each of said T-shaped connector plates is positioned on the longitudinal axis of said upper chord and the vertical portion of each of said T-shaped connector plates is positioned on the longitudinal axis of said vertical end sections of said tail truss.

* * * * *